US011314522B2

(12) United States Patent
Tsirkin et al.

(10) Patent No.: US 11,314,522 B2
(45) Date of Patent: Apr. 26, 2022

(54) FAST BOOT RESOURCE ALLOCATION FOR VIRTUAL MACHINES

(71) Applicant: RED HAT, INC., Raleigh, NC (US)

(72) Inventors: Michael Tsirkin, Lexington, MA (US); Paolo Bonzini, Milan (IT)

(73) Assignee: Red Hat, Inc., Raleigh, NC (US)

( * ) Notice: Subject to any disclaimer, the term of this patent is extended or adjusted under 35 U.S.C. 154(b) by 224 days.

(21) Appl. No.: 16/801,741

(22) Filed: Feb. 26, 2020

(65) Prior Publication Data
US 2021/0263745 A1    Aug. 26, 2021

(51) Int. Cl.
G06F 9/44       (2018.01)
G06F 9/4401     (2018.01)
G06F 12/1009    (2016.01)
G06F 9/455      (2018.01)

(52) U.S. Cl.
CPC ........ *G06F 9/4401* (2013.01); *G06F 9/45558* (2013.01); *G06F 12/1009* (2013.01); *G06F 2009/45583* (2013.01)

(58) Field of Classification Search
CPC . G06F 9/4401; G06F 9/45558; G06F 12/1009
See application file for complete search history.

(56) References Cited

U.S. PATENT DOCUMENTS

| | | |
|---|---|---|
| 7,480,755 B2 | 1/2009 | Herrell et al. |
| 7,757,231 B2 | 7/2010 | Anderson et al. |
| 9,354,896 B1 | 5/2016 | Yang et al. |
| 10,102,022 B2 | 10/2018 | Tsirkin |
| 2017/0199768 A1* | 7/2017 | Arroyo ............... G06F 13/4282 |
| 2017/0277632 A1* | 9/2017 | Moriki .................... G06F 12/08 |
| 2019/0146803 A1* | 5/2019 | Reed ........................ H04L 67/10 |
| | | 703/2 |

OTHER PUBLICATIONS

Clément Dévigne, "Executing Secured Virtual Machines within a Manycore Architecture", Hal Archives, 2016, 16 pages.
Nvidia Drive 5.0 Foundation SDK, Development Guide 5.0.5.0 Release, 2017, 28 pages.

* cited by examiner

*Primary Examiner* — Albert Wang
(74) *Attorney, Agent, or Firm* — Lowenstein Sandler LLP

(57) ABSTRACT

A hypervisor receives a notification from a guest operating system (OS) of a virtual machine (VM), where the notification indicates a guest OS access of a memory address associated with a device slot of a communication bus, where the device slot is unavailable to the guest OS; maps, in a page table of the hypervisor, a page table entry for a memory configuration space of the device slot to the memory address, where the page table entry indicates that the configuration space is available to the guest OS; identifies an additional device slot associated with the communication bus; and maps, in the page table, an additional page table entry for an additional memory configuration space of the additional device slot to an additional memory address, where the additional page table entry indicates that the additional configuration space is available to the guest OS.

20 Claims, 6 Drawing Sheets

FAST BOOT RESOURCE ALLOCATION FOR VIRTUAL MACHINES

TECHNICAL FIELD

The present disclosure is generally related to computer systems, and more particularly, to fast device boot resource allocation for virtualized computer systems.

BACKGROUND

A virtual machine (VM) is an emulation of a computer system. When executed on appropriate hardware, a VM creates an environment allowing the virtualization of an actual physical computer system (e.g., a server, a mainframe computer, etc.). The actual physical computer system is typically referred to as a "host machine." Typically, a component on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system" or "guest OS." The guest OS and applications executing within the guest OS can be collectively referred to as the "guest."

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
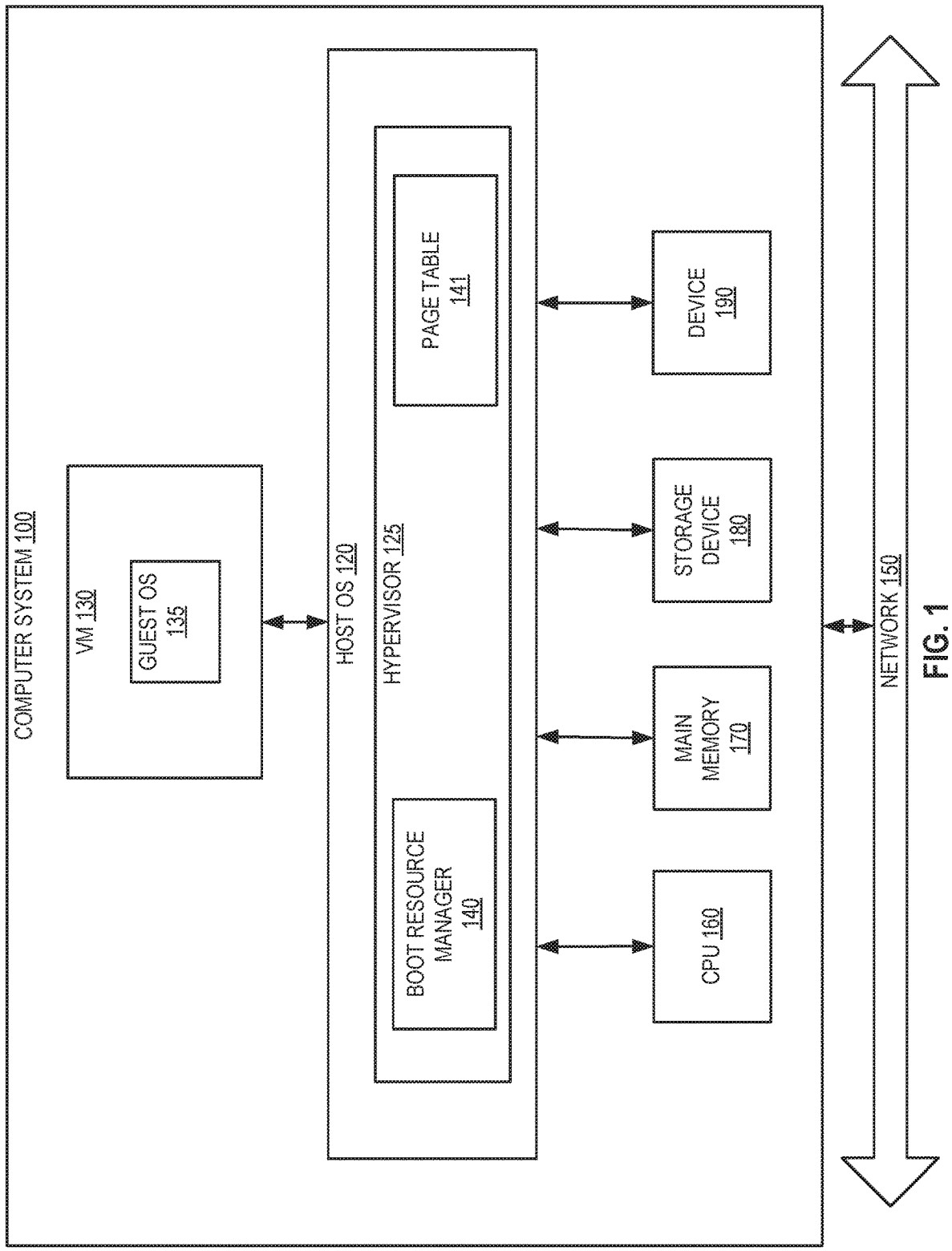
FIG. 1 depicts a high-level component diagram of an example computer system architecture, in accordance with one or more aspects of the present disclosure.

Described herein are methods and systems for fast boot resource allocation in virtualized computer systems. Guests in conventional virtualized environments can spend a large part of their startup time performing resource allocation operations. "Booting" is a startup sequence that starts the OS of a computer system when it is turned on. A boot sequence is the initial set of operations that the computer performs when it is switched on. During the boot cycle of a VM, the guest OS can attempt to initialize and allocate memory to be used by boot operations of the OS itself, allocate certain memory pages associated with applications that are to be executed immediately following the boot cycle, accessing memory resource associated with devices on a peripheral component interconnect (PCI) bus by probing the various device slots on the bus, or for other similar boot operations.

In conventional virtualized environments, when a guest OS attempts to allocate a resource, this can cause an input/output (I/O) operation to be performed on the memory address for that resource. An attempt to access that memory address can result in an I/O operation against an address that has not been allocated. This can result in a VM exit to the hypervisor (e.g., transitioning control to the hypervisor). The hypervisor may then determine that the guest OS has attempted to access a resource that is not allocated to the guest OS, and can cause the hypervisor to map a page table entry in the hypervisor's extended page table that maps the guest physical address (GPA) that the guest OS is attempting to access to the host physical address (HPA) of the memory page in host memory.

The conventional boot allocation process, however, can result in significant overhead during the startup of a VM due to VM exits issued for unallocated resources. This issue can be compounded in environments with a large number of resources to allocate, since the number of consecutive VM exits issued for multiple distinct memory resources may also be increased. Moreover, in virtualized environments with a large number of VMs, the performance impact is additionally increased since each guest OS can execute a similar allocation process during VM startup. In such cases a single memory page on a host system can result in a VM exit issued during startup of each VM in the system, which reduces the performance of the entire system as a whole.

Some conventional systems attempt to mitigate these performance issues by preallocating memory resources for a guest OS to avoid the additional startup overhead. This, however, can be problematic since the concept of VM boot is not well defined across systems. In other words, virtualized systems can vary widely in how their boot cycles are configured. In many conventional systems, a VM can be configured such that hardware topology can be probed late in the OS initialization process, which could occur well after the OS has executed a large amount of unrelated activity which could cause any preallocated hardware resources to be swapped out of memory before actually being accessed during the boot process.

Aspects of the present disclosure address the above noted and other deficiencies by implementing a boot resource manager to facilitate fast boot resource allocation for virtual machines. The boot resource manager can be invoked by a hypervisor to configure memory mappings and allocate memory pages for multiple memory resources that may be used by a guest OS without preallocating a large amount of those resources before VM boot operations. When the boot resource manager detects a VM exit caused by a guest attempting to access a resource that has not yet been allocated, the boot resource manager can interpret this as an indication that the guest OS is performing boot operations. For example, the boot resource manager can receive a notification that indicates a VM exit caused by the first attempt of a guest OS to access a memory address associated with a device slot of a communication bus (e.g., the first attempt by the guest OS to probe a device slot of a PCI communication bus). Additionally, the boot resource manager can receive a notification that indicates a VM exit caused by the first access by the guest OS of a memory address associated with a memory page. The boot resource manager can then identify memory resources that are analogous to the resource that caused the VM exit, and preallocate those memory resources to limit any additional VM exits during VM startup.

Aspects of the present disclosure present advantages over conventional solutions to the issues noted above. First, the boot resource manager of the present disclosure can provide significant reductions in resources used by VMs during startup. Since VM exits caused by resource allocation during the boot process can be significantly reduced, VM efficiency can be significantly improved in terms of processor cycles utilized during startup operations as well as overall elapsed time to complete the startup process for a VM. Additionally, since resource efficiency can be improved in a single VM, overall performance of a host system with many VMs can be dramatically improved.

FIG. 1 is a block diagram of a computer system 100 in which implementations of the disclosure may operate. Although implementations of the disclosure are described in accordance with a certain type of system, this should not be considered as limiting the scope or usefulness of the features of the disclosure.

As shown in FIG. 1, the computer system 100 is connected to a network 150 and comprises one or more central processing units (CPU) 160, main memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, main memory 170 may be non-uniform access (NUMA), such that memory access time depends on the memory location relative to CPU 160. The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet). It should be noted that although, for simplicity, a single CPU 160, storage device 180, and device 190 are depicted in FIG. 1, other implementations of computer system 100 may comprise a plurality of CPUs, storage devices, and devices.

Computer system 100 may additionally include a virtual machine (VM) 130. VM 130 may be an application environment that executes programs as though it was an actual physical machine. VM 130 may comprise a guest operating system (OS) 135 that can handle the execution of applications (not pictured) within the VM. It should be noted that although, for simplicity, a single VM 130 is depicted in FIG. 1, computer system 100 may host a plurality of VMs 130.

Computer system 100 may also include a host operating system (OS) 120, which may comprise software, hardware, or both, that manages the hardware resources of the computer system and that provides functions such as inter-process communication, scheduling, virtual memory management, and so forth. In some examples, host operating system 120 also includes a hypervisor 125, which provides a virtual operating platform for virtual machine (VM) 130 and that manages its execution. It should be noted that in some other examples, hypervisor 125 may be external to host OS 120, rather than embedded within host OS 120.

Hypervisor 125 can include boot resource manager 140 for facilitating fast boot resource allocation. In various implementations, boot resource manager 140 be invoked to configure memory mappings for memory addresses associated with unallocated memory resources to be used by guest OS 135 during the boot process. Additionally, in some implementations, boot resource manager 140 can allocate the memory pages for those memory addresses. In an illustrative example, boot resource manager 140 can detect a VM exit caused by a guest OS 135 access of a memory address associated with a memory resource that is unavailable to guest OS 135. In some implementations, the memory resource can be associated with a device slot of a PCI communication bus. Additionally, or alternatively the memory resource may be a memory page associated with an operation performed by guest OS 135, with a disk image or boot device, with an operation performed by an application program executed by guest OS 135 during or immediately following the boot process, or with any other additional boot operation associated with the guest OS 135.

Boot resource manager 140 can then map, in mapping table 141, a page table entry that maps the memory address accessed by guest OS 135 to a memory page, where the page table entry indicates that the memory page is available to guest OS 135 of VM 130. For example, boot resource manager 140 can map an extended page table (EPT) entry for the memory page that maps to the guest physical address (GPA) associated with the memory resource. The EPT entry for the memory page can be used by the CPU to cause the memory page to be provided to guest OS 135 responsive to detecting a read access of the memory address by guest OS 135.

Boot resource manager 140 can then identify one or more additional memory resources that are related to the memory resource that caused the VM exit. For example, if an access to a device caused the VM exit, boot resource manager 140 can identify other device related memory resources and allocate those resources as well. Similarly, if an access to a memory page used by the guest OS to perform a boot operation caused the VM exit, boot resource manager 140 can identify additional memory resources to be used for that boot operation (or other boot operations) and allocate those resources. Thus, during startup of VM 130, when guest OS 135 attempts to access these additional related resources, the CPU 160 can access the mapping table entry for the GPA of the resource, and access the memory page for that resource. The CPU can then provide the contents of the memory page to guest OS 135 without an additional VM exit being issued.

Boot resource manager 140 is described in further detail below with respect to FIGS. 2-3.

Figure 2:
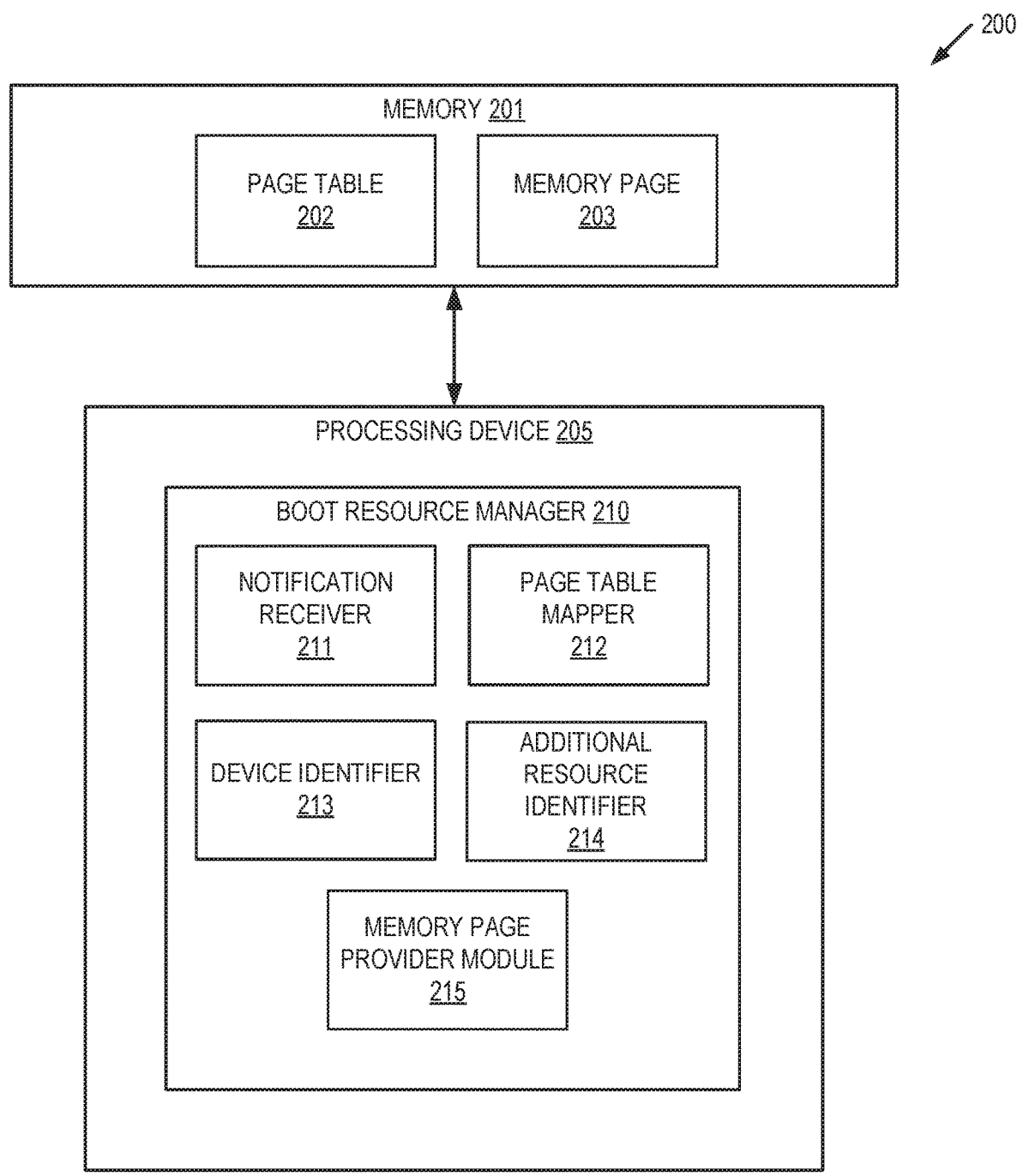
FIG. 2 depicts a block diagram illustrating an example of a boot resource manager to facilitate fast device discovery for virtual machines, in accordance with one or more aspects of the present disclosure.

FIG. 2 depicts a block diagram illustrating an example of a boot resource manager 210 for facilitating fast boot resource allocation for virtual machines. In some implementations, boot resource manager 210 may correspond to boot resource manager 140 of FIG. 1. As shown in FIG. 2, boot resource manager 210 may be a component of a computing apparatus 200 that includes a processing device 205, operatively coupled to a memory 201, to execute boot resource manager 210. In some implementations, processing device 205 and memory 201 may correspond to processing device 602 and main memory 604 respectively as described below with respect to FIG. 6.

Boot resource manager 210 may include notification receiver 211, page table mapper 212, device identifier 213, additional resource identifier 214, and memory page provider module 215. Alternatively, the functionality of one or more of notification receiver 211, page table mapper 212, device identifier 213, additional resource identifier 214, and memory page provider module 215 may be combined into a single module or divided into multiple sub-modules.

Notification receiver 211 is responsible for receiving a notification from a guest OS of a VM, where the notification indicates a guest OS access of a memory address associated with a device slot of a communication bus. In various implementations, the communication bus can be a peripheral component interconnect (PCI) bus, a PCI express bus, or the like. As noted above, each slot of a communication bus can be used to connect to a hardware device (e.g., network interface card (NIC), graphical processing unit (GPU) card, a sound card, a wireless adapter card, or the like). Each slot of the communication bus may be associated with a particular memory address that can be used to address configuration space for the associated device for a particular device slot. In various implementations, when a device slot is unoccupied/unassigned (e.g., is not associated with any hardware device), the memory address for the device slot may not be mapped to a memory page in a memory page table. Additionally, when a device slot is occupied (e.g., is associated with a hardware device on the host), the memory address for the device slot may not be mapped to a memory page in the memory table until the first attempt of the guest OS to access the device. In this latter case, while the device slot may be occupied from the perspective of the host, the device resources may not be "present" from the perspective of the guest OS (e.g., a non-existing or non-accessible resource).

In some implementations, the notification can be a VM exit caused by the guest OS responsive to the access of the memory address associated with the device. For example, during the boot process of the VM, the guest OS can probe the different device slots of the communication bus to allocate resources for each device. Whether or not there is a device associated with a particular slot, in some cases there may be a mapping table entry for the guest physical address in the guest OS mapping tables, but there may not be a corresponding entry for that memory address in the hypervisor mapping table (e.g., the extended page table (EPT) that maps the guest physical address to a host physical address). In such instances, the CPU may not be able to identify the host memory address for the device slot based on the guest OS mapping table during its initial boot process. This can cause a VM exit to the hypervisor to cause the hypervisor to build the EPT mapping for the device slot.

Page table mapper 212 is responsible for mapping, in a page table of the hypervisor (e.g., page table 202), a page table entry for a memory configuration space of the device slot to the memory address (e.g., the memory address associated with the device slot that the guest OS attempted to access). The resulting page table entry can indicate that the configuration space of the device slot is available to the guest OS. For example, page table mapper 212 can create a page table in entry in the extended page table (EPT) of the hypervisor that maps the guest physical address (GPA) of the device slot to a host physical address associated with the configuration space for the device assigned to that device slot. As noted above, when the guest OS attempts to access configuration space for a device the first time, a VM exit can be caused by the guest OS to notify boot resource manager 210. The VM exit can provide, among other information, the GPA of the applicable memory configuration space.

As noted above, notification receiver 211 can detect a VM exit as a result of the guest OS attempting to access a device slot (e.g., via a probe operation) for the first time during the boot process. In cases where the device slot is associated with a device on the host, page table mapper 212 can create an entry in the EPT that maps the GPA of the device slot to the host physical address of the configuration memory space on the host. In some implementations, page table mapper 212 can also invoke memory page provider module 215 to allocate a memory page for the configuration space (e.g., memory page 203), and provide the configuration space to the guest OS.

In other implementations, the VM exit can indicate that the guest OS has attempted to access (or probe) the device slot that is not associated with any device. In this latter case, page table mapper 212 can create an entry in the EPT that maps the GPA of the device slot to the host physical address of a read only memory page associated with the device slot. Memory page provider module 215 can subsequently be invoked to allocate the read only memory page with information that can notify the guest OS that the device slot is unoccupied/unassigned responsive to a subsequent access by the guest OS. In such cases, the subsequent access can receive the information to indicate the device slot is unoccupied without resulting in another VM exit.

Device identifier 213 is responsible for identifying an additional device slot associated with the communication bus. As noted above, during the boot process, the guest OS can probe the device slots of the communication bus one after the other to detect the device associated with the device slot and load the appropriate device drivers for the device. In each case, the probe of each device slot can result in a separate VM exit. To prevent this, responsive to detecting the VM exit for a device slot access during the boot cycle of the guest OS, device identifier 213 can be invoked to identify other devices associated with the communication bus. Page table mapper 212 can then be invoked to create mapping table entries for the additional devices as well as allocate the memory resources for the corresponding device slot.

In some implementations, device identifier 213 can be configured to identify additional device slots of the communication bus based on the device access that caused the VM exit. For example, if the VM exit is caused by the guest OS attempting to access a device slot that is associated with a device on the host, device identifier 213 can identify other device slots for the communication bus that are associated with actual hardware devices. Similarly, if the VM exit is caused by the guest OS attempting to access a device slot that is not associated with any device on the host, device identifier 213 can identify other device slots for the communication bus that are not associated with any hardware devices. In other implementations, device identifier 213 can identify all other device slots regardless of the cause of the VM exit. In such instances, responsive to detecting any VM exit caused by an guest OS attempt to access a device slot, device identifier 213 can identify all other device slots for the communication bus.

In various implementations, page table mapper 212 can subsequently be invoked to generate the appropriate page table entries in the hypervisor EPT (e.g., page table 202) for each of the additional device slots. In the case where an additional device slot is associated with a hardware device, the EPT entry can be created to map the GPA of the device slot to the host physical memory address of the memory configuration space of the device slot on the host. In some implementations, memory page provider module 215 can then be invoked to allocate one or more memory pages for the memory configuration space so that any subsequent attempt by the guest OS to access the device slot can be processed without generating a VM exit. Similarly, if the additional device slot is not associated with any hardware device, the EPT entry can be created to map the GPA of the device slot to a host physical memory address of a read only memory page that can be associated with the empty device slot. In such instances, memory page provider module 215 can then be invoked to allocate the read only memory page for the empty device slot so that any subsequent attempt by the guest OS to access that device slot can be processed without generating a VM exit.

Additional resource identifier 214 is responsible for identifying additional resources to be accessed during the boot process for the guest OS that can be mapped in the EPT. In one illustrative example, additional resource identifier 214 can be configured to identify a disk image for the guest OS. In various implementations, the disk image is a read only data files stored on the host system that are viewed by the guest OS as a storage device (e.g., hard drive, etc.) that contains data. A disk image can be a data file image for the guest OS that includes, among other things, guest OS configuration information, a boot sector for the guest OS, user data, or the like. Additional resource identifier 214 can identify the disk image and load at least a portion of the disk image into host memory to be used by the boot operation of the guest OS to prevent accesses of the disk image from causing a VM exit later during the boot process.

In another example, additional resource identifier 214 can be configured to identify one or more additional resources associated with a boot device for the guest OS. A boot device is any piece of hardware that can read or contains the files required for a VM to start. In such instances, additional resource identifier can identify those resources and create mapping table entries in the EPT so that the resources are available to the guest OS prior to receiving any notification (e.g., VM exit) from the guest OS that the resources are needed.

Memory page provider module 215 is responsible for allocating memory pages for any identified device slots as described above. In some implementations, memory page provider module can provide a memory page associated with the configuration space of a device slot to the guest OS responsive to detecting the VM exit. In various implementations, the process of mapping page table entries in the EPT of the hypervisor for the additional resources that have been identified can cause those resources to be provided to the guest OS responsive to detecting a subsequent access of those additional resources by the guest OS without causing an additional VM exit.

In some implementations, boot resource manager 210 can additionally monitor memory 201 for out of memory conditions associated with the guest OS. Responsive to detecting such a condition, boot resource manager 210 can invoke page table mapper 212 to unmap the page table entries for any additional resources and deallocate any associated memory page. This can be repeated for multiple additional resources until a sufficient number of page table entries and/or memory pages have been deallocated to correct the out of memory condition.

Figure 3:
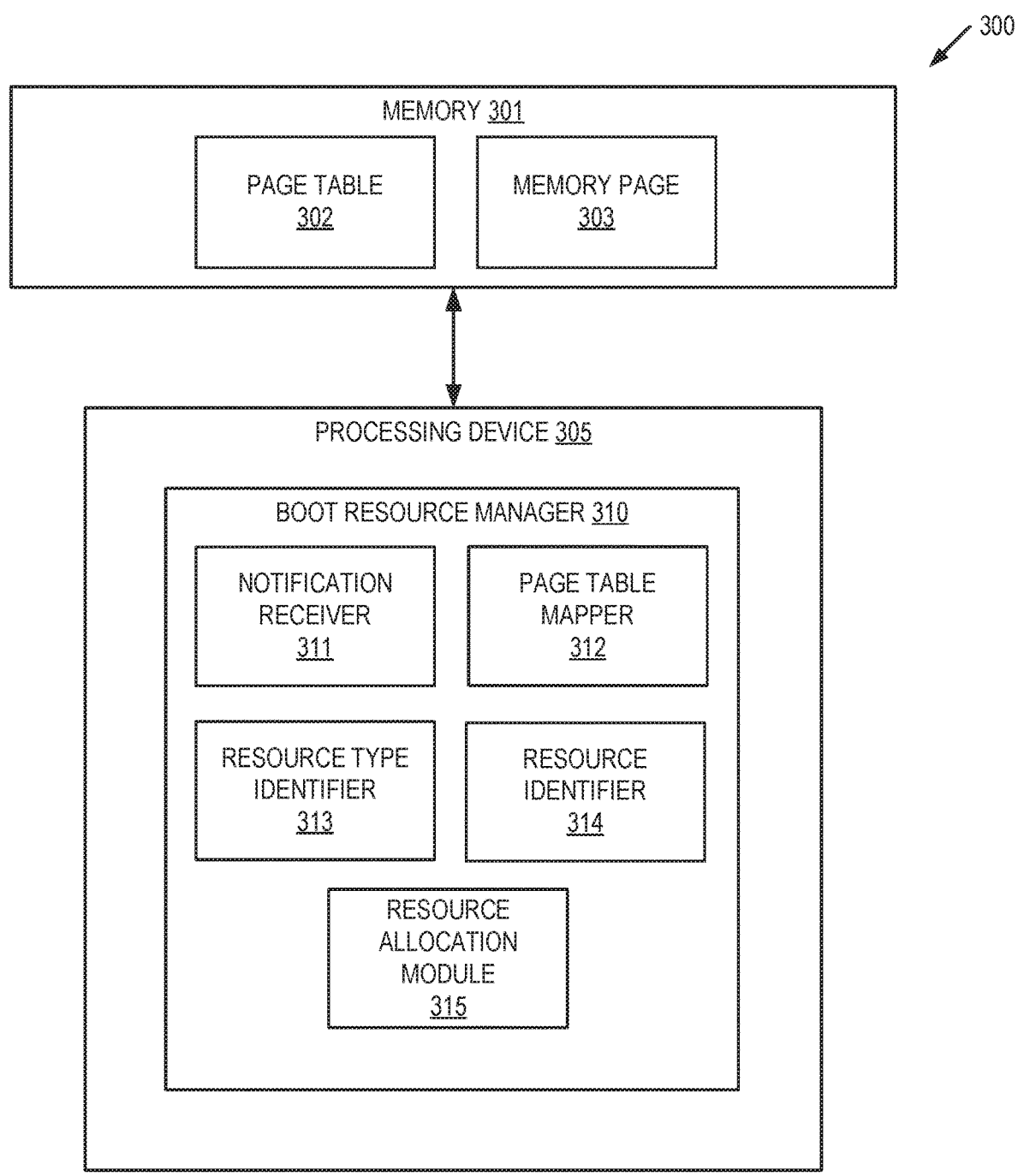
FIG. 3 depicts a block diagram illustrating another example of a boot resource manager to facilitate fast device discovery for virtual machines, in accordance with one or more aspects of the present disclosure.

FIG. 3 depicts a block diagram illustrating another example of a boot resource manager 310 for facilitating fast boot resource allocation for virtual machines. In some implementations, boot resource manager 310 may correspond to boot resource manager 140 of FIG. 1. As shown in FIG. 3, boot resource manager 310 may be a component of a computing apparatus 300 that includes a processing device 305, operatively coupled to a memory 301, to execute boot resource manager 310. In some implementations, processing device 305 and memory 301 may correspond to processing device 602 and main memory 604 respectively as described below with respect to FIG. 6.

Boot resource manager 310 may include notification receiver 311, page table mapper 312, resource type identifier 313, resource identifier 314, and resource provider module 315. Alternatively, the functionality of one or more of notification receiver 311, page table mapper 312, resource type identifier 313, resource identifier 314, and resource provider module 315 may be combined into a single module or divided into multiple sub-modules.

Notification receiver 311 is responsible for receiving a notification from a guest OS of a VM, where the notification indicates a guest OS access of a memory resource that is unavailable to the guest OS. In various implementations, the memory resource may be a memory page associated with a boot operation of the guest OS, a memory page associated with a configuration space of a device, a memory page associated with a portion of a disk image, or any similar memory resource that can be accessed by a guest OS during or after its boot cycle.

In some implementations, the notification can be a VM exit caused by the guest OS responsive to the access of the memory resource. As noted above, during the boot process of the VM, the guest OS can probe different device slots of a communication bus to allocate resources for each device. Whether or not there is a device associated with a particular slot, in some cases there may be a mapping table entry for the guest physical address in the guest OS mapping tables, but there may not be a corresponding entry for that memory address in the hypervisor mapping table (e.g., the extended page table (EPT) that maps the guest physical address to a host physical address). In such instances, the CPU may not be able to identify the host memory address for the device slot based on the guest OS mapping table during its initial boot process. This can cause a VM exit to the hypervisor to cause the hypervisor to build the EPT mapping for the device slot.

Similarly, the guest OS may attempt to access memory pages associated with OS software or data that is to be used during or immediately following the boot process. On initial access to the memory page, there may be a mapping table entry for the guest physical address of the memory page in the guest OS mapping tables, but there may not be a corresponding entry for that memory address in the hypervisor mapping table (e.g., the extended page table (EPT) that maps the guest physical address to a host physical address). In such instances, the CPU may not be able to identify the host memory address for the device slot based on the guest OS mapping table during its initial boot process. This can cause a VM exit to the hypervisor to cause the hypervisor to build the EPT mapping for the memory page.

Page table mapper 312 is responsible for mapping, in a page table of the hypervisor (e.g., page table 302), a page table entry for the memory resource. The resulting page table entry can indicate that the memory resource is available to the guest OS. For example, page table mapper 312 can create a page table in entry in the extended page table (EPT) of the hypervisor that maps the guest physical address (GPA) of the resource to a host physical address associated with a memory page for that resource. As noted above, when the guest OS attempts to access a memory page for a resource for the first time, a VM exit can be caused by the guest OS to notify boot resource manager 310. The VM exit can provide, among other information, the GPA of the applicable memory resource.

Resource type identifier 313 is responsible for determining a resource type for the memory resource. The resource type can subsequently be used to identify other resources of the same type and make those resources available to the guest OS without causing a VM exit when the guest OS attempts to access them. For example, if the VM exit was caused by a guest OS access of a memory page associated with a component OS, the resource type can be identified as an OS related memory resource. Similarly, if the VM exit was caused by a guest OS access of a memory page associated with the configuration space of a device, the device type can be identified as a device related memory resource. In such instances, the resource type can be identified as a device related resource. Alternatively, the resource type can indicate the type of device (e.g., communication interface, input/output interface, etc.) associated with the memory resource rather than being generally device related. In other implementations, the resource type can be identified as a memory resource associated with a particular boot operation (e.g., loading the boot sector, loading device drivers, or the like). Moreover, if the memory resource is associated with an application program that may be accessed immediately following the boot process, the resource type can be identified as an application related resource. Although specific examples have been listed, in various implementations other types of memory resource types can be identified by resource type identifier 313.

Resource identifier 314 is responsible for identifying an additional memory resource associated with the resource type identified by resource type identifier 313. For example, if resource type identifier 313 identifies a resource type that indicates an application related memory resource, resource identifier 314 can identify memory resources for other applications that may be accessed during or immediately following the boot process. Similarly, if resource type identifier 313 identifies a resource type that indicates an OS related memory resource, resource identifier 314 can identify memory pages on the host that may be associated with one or more other OS related memory resources that may be accessed by the same or other boot operations invoked during the boot process.

In implementations where the resource type indicates a device related resource, resource identifier 314 can identify one or more additional device related memory resources to be allocated. For example, if resource type identifier 313 identifies a device type, resource identifier 314 can identify additional devices of the same type. Similarly, if resource type identifier 313 determines that the device type indicates a device generally, resource identifier 314 can identify other devices on the same communication bus regardless of type.

Resource allocation module 315 is responsible for allocating the memory resources associated with the additional memory resources identified by resource identifier 314. In various implementations, resource allocation module 315 can map in the EPT of the hypervisor, an additional page table entry for each additional memory resource to indicate that resource is available to the guest OS. As noted above, this can be accomplished by mapping the GPA of the resource to the host physical address of the memory page for the resource. In some implementations, after creating the mapping table entry for the additional resource, resource allocation module 315 can generate a memory page for the resource if not already allocated by the host system. Resource allocation module 315 can additionally mark the EPT entry for the memory page as present to the guest OS to cause that memory page to be provided to the guest OS responsive to the CPU detecting a subsequent access of the GPA of that resource by the guest OS.

In some implementations, boot resource manager 310 can additionally monitor memory 301 for out of memory conditions associated with the guest OS. Responsive to detecting such a condition, boot resource manager 310 can invoke page table mapper 312 to unmap the page table entries for any additional resources and deallocate any associated memory page. This can be repeated for multiple additional resources until a sufficient number of page table entries and/or memory pages have been deallocated to correct the out of memory condition.

Figure 4:
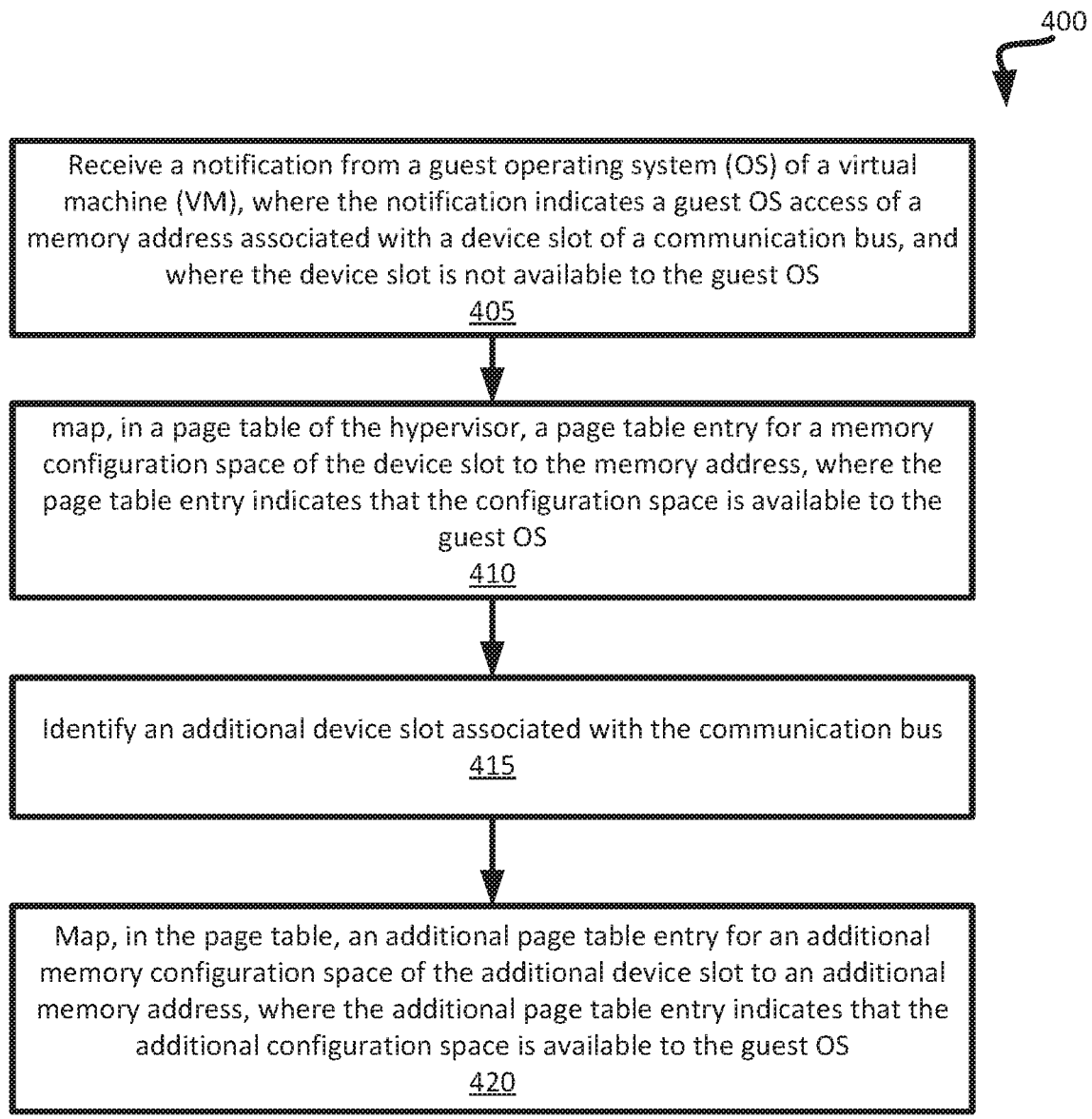
FIG. 4 depicts a flow diagram of a method for facilitating fast boot resource allocation for virtual machines, in accordance with one or more aspects of the present disclosure.

FIG. 4 depicts a flow diagram of an example method 400 for facilitating fast boot resource allocation for virtual machines. The method may be performed by processing logic that may comprise hardware (circuitry, dedicated logic, etc.), computer readable instructions (run on a general purpose computer system or a dedicated machine), or a combination of both. In an illustrative example, method 400 may be performed by boot resource manager 140 in FIG. 1, or boot resource manager 210 in FIG. 2. Alternatively, some or all of method 400 might be performed by another module or machine. It should be noted that blocks depicted in FIG. 4 could be performed simultaneously or in a different order than that depicted.

At block 405, processing logic receives a notification from a guest operating system (OS) of a virtual machine (VM), where the notification indicates a guest OS access of a memory address associated with a device slot of a communication bus, and the device slot is unavailable to the guest OS. At block 410, processing logic maps, in a page table of the hypervisor, a page table entry for a memory configuration space of the device slot to the memory address, where the page table entry indicates that the configuration space is available to the guest OS. At block 415, processing logic identifies an additional device slot associated with the communication bus. At block 420, processing logic maps, in the page table, an additional page table entry for an additional memory configuration space of the additional device slot to an additional memory address, where the additional page table entry indicates that the additional configuration space is available to the guest OS.

Figure 5:
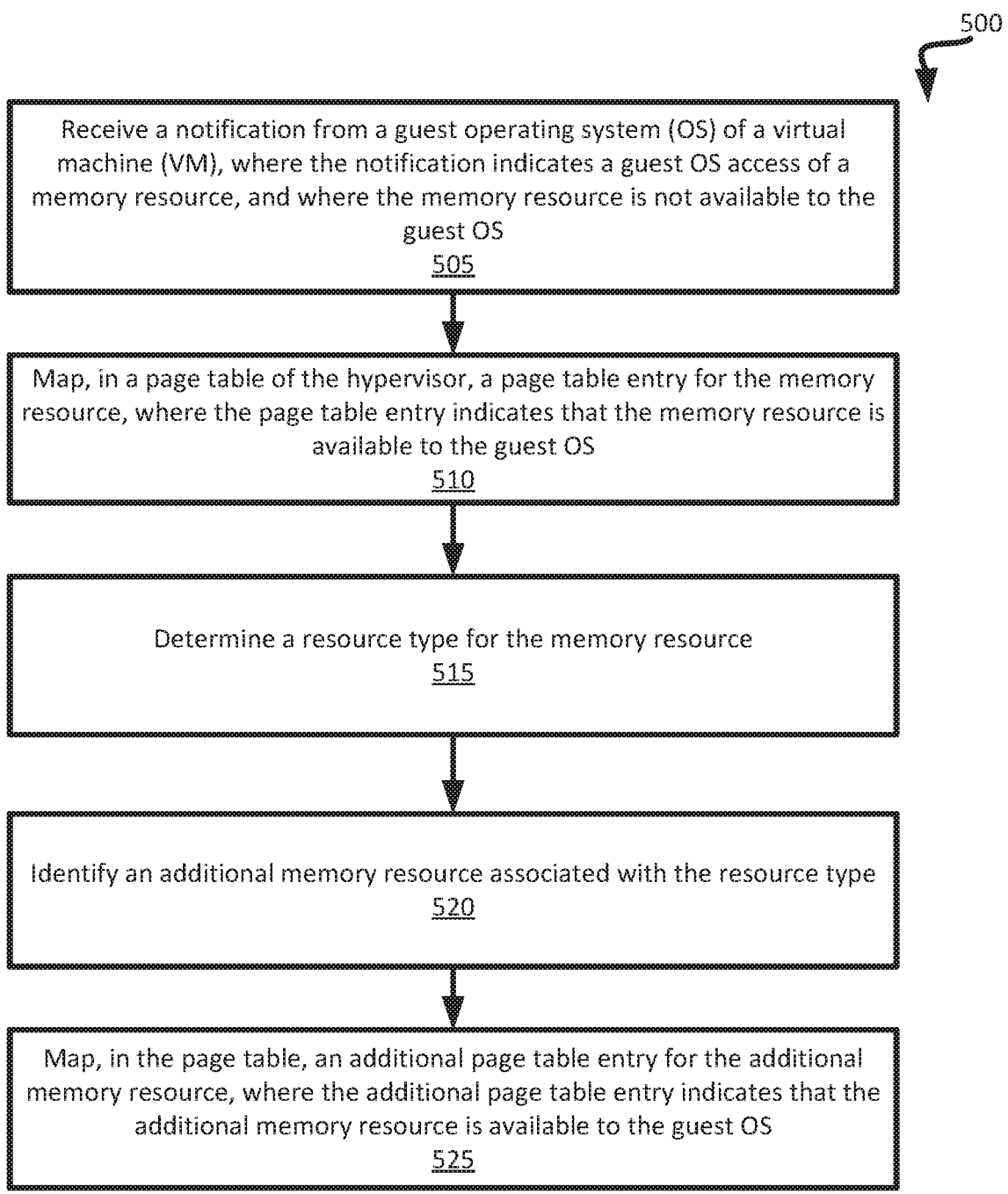
FIG. 5 depicts a flow diagram of another method for facilitating fast boot resource allocation for virtual machines, in accordance with one or more aspects of the present disclosure.

FIG. 5 depicts a flow diagram of an example method 500 for facilitating fast boot resource allocation for virtual machines. The method may be performed by processing logic that may comprise hardware (circuitry, dedicated logic, etc.), computer readable instructions (run on a general purpose computer system or a dedicated machine), or a combination of both. In an illustrative example, method 500 may be performed by boot resource manager 140 in FIG. 1, or boot resource manager 310 in FIG. 3. Alternatively, some or all of method 500 might be performed by another module or machine. It should be noted that blocks depicted in FIG. 5 could be performed simultaneously or in a different order than that depicted.

At block 505, processing logic receives a notification from a guest operating system (OS) of a virtual machine (VM), where the notification indicates a guest OS access of a memory resource, and wherein the memory resource is unavailable to the guest OS.

At block 510, processing logic maps, in a page table of the hypervisor, a page table entry for the memory resource, where the page table entry indicates that the memory resource is available to the guest OS. At block 515, processing logic determines a resource type for the memory resource. At block 520, processing logic identifies an additional memory resource associated with the resource type. At block 525, processing logic maps, in the page table, an additional page table entry for the additional memory resource, where the additional page table entry indicates that the additional memory resource is available to the guest OS.

Figure 6:
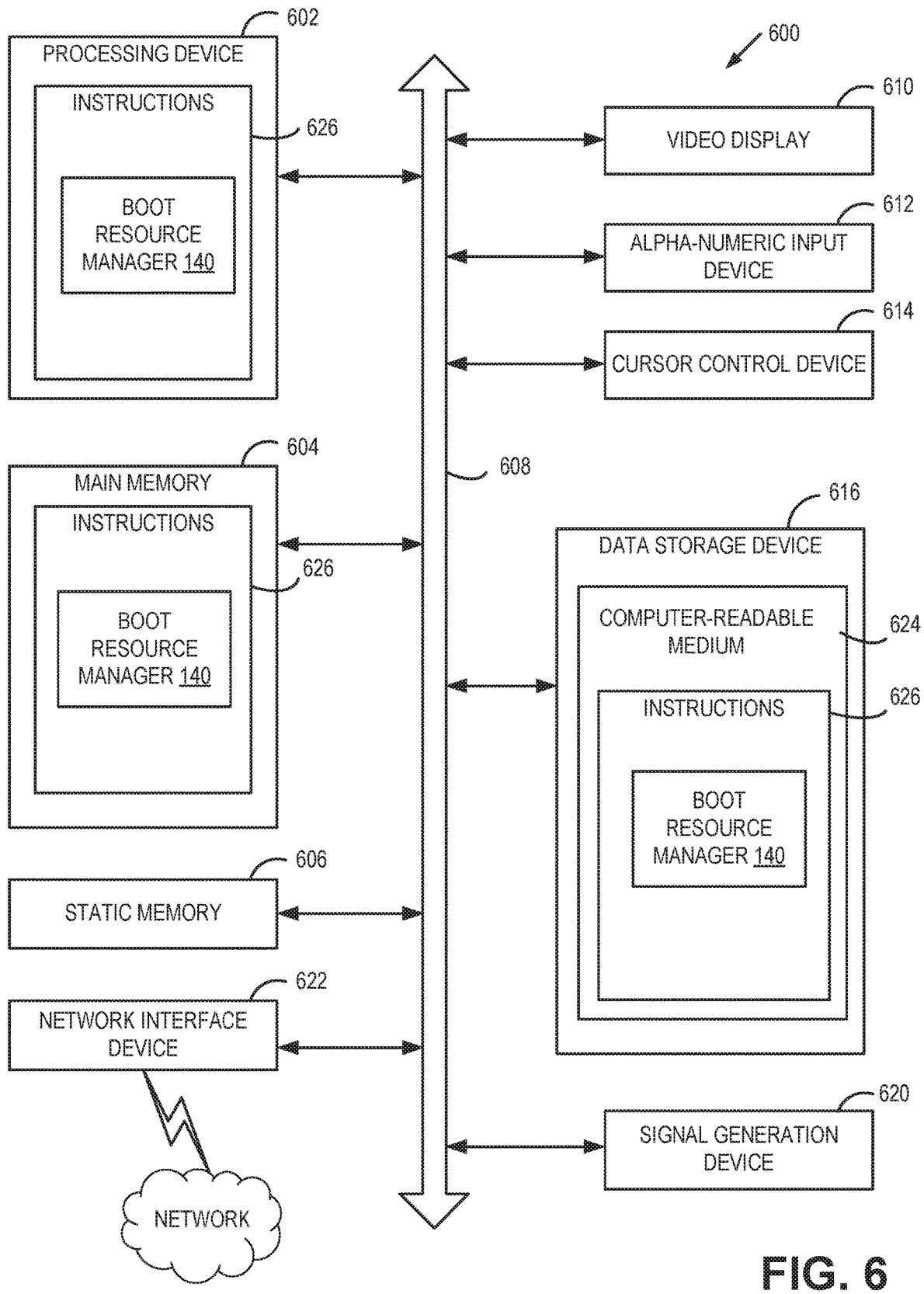
FIG. 6 depicts a block diagram of an illustrative computer system operating in accordance with one or more aspects of the present disclosure.

FIG. 6 depicts an example computer system 600 which can perform any one or more of the methods described herein. In one example, computer system 600 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 600 includes a processing device 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic (e.g., instructions 626) that includes boot resource manager 140 for performing the operations and steps discussed herein (e.g., corresponding to the method of FIGS. 4-5, etc.).

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker). In one illustrative example, the video display unit 610, the alphanumeric input device 612, and the cursor control device 614 may be combined into a single component or device (e.g., an LCD touch screen).

The data storage device 616 may include a non-transitory computer-readable medium 624 on which may store instructions 626 that include boot resource manager 140 (e.g., corresponding to the method of FIGS. 4-5, etc.) embodying any one or more of the methodologies or functions described herein. Boot resource manager 140 may also reside, completely or at least partially, within the main memory 604 and/or within the processing device 602 during execution thereof by the computer system 600, the main memory 604 and the processing device 602 also constituting computer-readable media. Boot resource manager 140 may further be transmitted or received over a network via the network interface device 622.

While the computer-readable storage medium 624 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "receiving," "mapping," "identifying," "causing," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

Other computer system designs and configurations may also be suitable to implement the system and methods described herein. The following examples illustrate various implementations in accordance with one or more aspects of the present disclosure.

Example 1 is a method comprising receiving, by a processing device executing a hypervisor, a notification from a guest operating system (OS) of a virtual machine (VM), wherein the notification indicates a guest OS access of a memory address associated with a device slot of a communication bus, wherein the device slot is unavailable to the guest OS; mapping, in a page table of the hypervisor, a page table entry for a memory configuration space of the device slot to the memory address, wherein the page table entry indicates that the configuration space is available to the guest OS; identifying an additional device slot associated with the communication bus; and mapping, by the processing device executing the hypervisor, in the page table, an additional page table entry for an additional memory configuration space of the additional device slot to an additional memory address, wherein the additional page table entry indicates that the additional configuration space is available to the guest OS.

Example 2 is the method of Example 1, further comprising causing the additional memory configuration space of the additional device slot to be provided to the guest OS responsive to detecting a subsequent access of the additional memory address by the guest OS.

Example 3 is the method of Example 2, further comprising determining that the device slot of the communication bus is not associated with any device; identifying one or more additional device slots that are not associated with any device; generating one or more memory pages for the one or more additional device slots; and mapping, in the page table, one or more additional page table entries for each of the corresponding one or more additional device slots, wherein the one or more additional page table entries indicate that the corresponding memory pages are read only for the guest OS.

Example 4 is the method of Example 2, further comprising identifying a disk image for the guest OS; and loading, into hypervisor memory, at least a portion of the disk image for the guest OS.

Example 5 is the method of Example 2, further comprising identifying one or more additional resources associated with a boot device for the guest OS; and mapping, in the page table, page table entries for the one or more additional resources associated with the boot device.

Example 6 is the method of Example 1, wherein the notification comprises a VM exit caused by the guest OS access of the memory address associated with the device.

Example 7 is the method of Example 1, further comprising detecting an out of memory condition associated with the guest OS; and responsive to detecting the out of memory condition, unmapping the additional page table entry.

Example 8 is a system comprising a memory, and a processing device, operatively coupled to the memory, to execute a hypervisor to: receive a notification from a guest operating system (OS) of a virtual machine (VM), wherein the notification indicates a guest OS access of a memory address associated with a device slot of a communication bus, wherein the device slot is unavailable to the guest OS; mapping, in a page table of the hypervisor, a page table entry for a memory configuration space of the device slot to the memory address, wherein the page table entry indicates that the configuration space is available to the guest OS; identify an additional device slot associated with the communication bus; and map, by the processing device executing the hypervisor, in the page table, an additional page table entry for an additional memory configuration space of the additional device slot to an additional memory address, wherein the additional page table entry indicates that the additional configuration space is available to the guest OS.

Example 9 is the system of Example 8, wherein the processing device is further to: cause the additional memory configuration space of the additional device slot to be provided to the guest OS responsive to detecting a subsequent access of the additional memory address by the guest OS.

Example 10 is the system of Example 9, wherein the processing device is further to: determine that the device slot of the communication bus is not associated with any device; identify one or more additional device slots that are not associated with any device; generate one or more memory pages for the one or more additional device slots; and map, in the page table, one or more additional page table entries for each of the corresponding one or more additional device slots, wherein the one or more additional page table entries indicate that the corresponding memory pages are read only for the guest OS.

Example 11 is the system of Example 9, wherein the processing device is further to: identify a disk image for the guest OS; and load, into hypervisor memory, at least a portion of the disk image for the guest OS.

Example 12 is the system of Example 9, wherein the processing device is further to: identify one or more additional resources associated with a boot device for the guest OS; and map, in the page table, page table entries for the one or more additional resources associated with the boot device.

Example 13 is the system of Example 8, wherein the notification comprises a VM exit caused by the guest OS access of the memory address associated with the device.

Example 14 is the system of Example 8, wherein the processing device is further to: detecting an out of memory condition associated with the guest OS; and responsive to detecting the out of memory condition, unmapping the additional page table entry.

Example 15 is a non-transitory computer readable medium comprising instructions, which when accessed by a processing device, cause the processing device to execute a hypervisor to: detect a virtual machine (VM) exit issued by a guest operating system (OS) of the VM responsive to a guest OS access of a memory address associated with a device slot of a communication bus, wherein the device slot is unavailable to the guest OS; map, in a page table of the hypervisor, a page table entry for a memory configuration space of the device slot to the memory address, wherein the page table entry indicates that the configuration space is available to the guest OS; identify an additional device slot associated with the communication bus; and map, by the processing device executing the hypervisor, in the page table, an additional page table entry for an additional memory configuration space of the additional device slot to an additional memory address, wherein the additional page table entry indicates that the additional configuration space is available to the guest OS.

Example 16 is the non-transitory computer readable medium of Example 15, wherein the processing device is further to: cause the additional memory configuration space of the additional device slot to be provided to the guest OS responsive to detecting a subsequent access of the additional memory address by the guest OS.

Example 17 is the non-transitory computer readable medium of Example 16, wherein the processing device is further to: determine that the device slot of the communication bus is not associated with any device; identify one or more additional device slots that are not associated with any device; generate one or more memory pages for the one or more additional device slots; and map, in the page table, one or more additional page table entries for each of the corresponding one or more additional device slots, wherein the one or more additional page table entries indicate that the corresponding memory pages are read only for the guest OS.

Example 18 is the non-transitory computer readable medium of Example 16, wherein the processing device is further to: identify a disk image for the guest OS; and load, into hypervisor memory, at least a portion of the disk image for the guest OS.

Example 19 is the non-transitory computer readable medium of Example 15, wherein the processing device is further to: identify one or more additional resources associated with a boot device for the guest OS; and map, in the page table, page table entries for the one or more additional resources associated with the boot device.

Example 20 is the non-transitory computer readable medium of Example 15, wherein the processing device is further to: detect an out of memory condition associated with the guest OS; and responsive to detecting the out of memory condition, unmap the additional page table entry.

Example 21 is a method comprising: receiving, by a processing device executing a hypervisor, a notification from a guest operating system (OS) of a virtual machine (VM), wherein the notification indicates a guest OS access of a memory resource, wherein the memory resource is unavailable to the guest OS; mapping, in a page table of the hypervisor, a page table entry for the memory resource, wherein the page table entry indicates that the memory resource is available to the guest OS; determining a resource type for the memory resource; identifying an additional memory resource associated with the resource type; and mapping, by the processing device executing the hypervisor, in the page table, an additional page table entry for the additional memory resource, wherein the additional page table entry indicates that the additional memory resource is available to the guest OS.

Example 22 is the method of Example 21, further comprising: generating a memory page for the additional memory resource; and causing the memory page of the additional memory resource to be provided to the guest OS responsive to detecting a subsequent access of the additional memory resource by the guest OS.

Example 23 is the method of Example 21, wherein the resource type comprises a device type, the method further comprising: identifying one or more additional devices associated with the device type; generating one or more memory pages for each of the one or more additional devices; and mapping, in the page table, one or more additional page table entries for each of the corresponding one or more additional memory pages.

Example 24 is the method of Example 21, wherein the resource type indicates a device, the method further comprising: identifying one or more additional devices; generating one or more memory pages for each of the one or more additional devices; and mapping, in the page table, one or more additional page table entries for each of the corresponding one or more additional memory pages.

Example 25 is the method of Example 21, further comprising: determining that the resource type comprises a memory page associated with a boot operation of the guest OS; identifying an additional memory page associated with an additional boot operation of the guest OS; loading, into hypervisor memory, the additional memory page.

Example 26 is the method of Example 21, wherein the notification comprises a VM exit caused by the guest OS access of the memory resource.

Example 27 is the method of Example 21, further comprising: detecting an out of memory condition associated with the guest OS; responsive to detecting the out of memory condition: unmapping the additional page table entry; and deallocating a memory page associated with the additional page table entry.

Example 28 is a system comprising a memory, and a processing device, operatively coupled to the memory, to execute a hypervisor to: detect a virtual machine (VM) exit issued by a guest operating system (OS) of the VM responsive to an access by the guest OS of a memory resource, wherein the memory resource is unavailable to the guest OS; map, in a page table of the hypervisor, a page table entry for the memory resource, wherein the page table entry indicates that the memory resource is available to the guest OS; determine a resource type for the memory resource; identify an additional memory resource associated with the resource type; and map, by the processing device executing the hypervisor, in the page table, an additional page table entry for the additional memory resource, wherein the additional page table entry indicates that the additional memory resource is available to the guest OS.

Example 29 is the system of Example 28, wherein the processing device is further to: generate a memory page for the additional memory resource; and cause the memory page of the additional memory resource to be provided to the guest OS responsive to detecting a subsequent access of the additional memory resource by the guest OS.

Example 30 is the system of Example 28, wherein the resource type comprises a device type, and wherein the processing device is further to: identify one or more additional devices associated with the device type; generate one or more memory pages for each of the one or more additional devices; and map, in the page table, one or more additional page table entries for each of the corresponding one or more additional memory pages.

Example 31 is the system of Example 28, wherein the resource type indicates a device, and wherein the processing device is further to: identify one or more additional devices; generate one or more memory pages for each of the one or more additional devices; and map, in the page table, one or more additional page table entries for each of the corresponding one or more additional memory pages.

Example 32 is the system of Example 28, wherein the processing device is further to: determine that the resource type comprises a memory page associated with a boot operation of the guest OS; identify an additional memory page associated with an additional boot operation of the guest OS; load, into hypervisor memory, the additional memory page.

Example 33 is the system of Example 28, wherein the processing device is further to: detecting an out of memory condition associated with the guest OS; responsive to detecting the out of memory condition: unmap the additional page table entry; and deallocate a memory page associated with the additional page table entry.

Example 34 is a non-transitory computer readable medium comprising instructions, which when accessed by a processing device, cause the processing device to execute a hypervisor to: detect a virtual machine (VM) exit issued by a guest operating system (OS) of the VM responsive to an access by the guest OS of a memory resource, wherein the memory resource is unavailable to the guest OS; map, in a page table of the hypervisor, a page table entry for the memory resource, wherein the page table entry indicates that the memory resource is available to the guest OS; determine a resource type for the memory resource; identify an additional memory resource associated with the resource type; and map, by the processing device executing the hypervisor, in the page table, an additional page table entry for the additional memory resource, wherein the additional page table entry indicates that the additional memory resource is available to the guest OS.

Example 35 is the non-transitory computer readable medium of Example 35, wherein the processing device is further to: generate a memory page for the additional memory resource; and cause the memory page of the additional memory resource to be provided to the guest OS responsive to detecting a subsequent access of the additional memory resource by the guest OS Example 36 is the non-transitory computer readable medium of Example 35, wherein the processing device is further to: identify one or more additional devices associated with the device type; generate one or more memory pages for each of the one or more additional devices; and map, in the page table, one or more additional page table entries for each of the corresponding one or more additional memory pages Example 37 is the non-transitory computer readable medium of Example 36, wherein the processing device is further to: identify one or more additional devices; generate one or more memory pages for each of the one or more additional devices; and map, in the page table, one or more additional page table entries for each of the corresponding one or more additional memory pages.

Example 38 is the non-transitory computer readable medium of Example 35, wherein the processing device is further to: determine that the resource type comprises a memory page associated with a boot operation of the guest OS; identify an additional memory page associated with an additional boot operation of the guest OS; load, into hypervisor memory, the additional memory page.

Example 39 is the non-transitory computer readable medium of Example 35, wherein the processing device is further to: detecting an out of memory condition associated with the guest OS; responsive to detecting the out of memory condition: unmap the additional page table entry; and deallocate a memory page associated with the additional page table entry.

Example 40 is an apparatus comprising means for receiving, by a processing device executing a hypervisor, a notification from a guest operating system (OS) of a virtual machine (VM), wherein the notification indicates a guest OS access of a memory address associated with a device slot of a communication bus, wherein the device slot is unavailable to the guest OS; means for mapping, in a page table of the hypervisor, a page table entry for a memory configuration space of the device slot to the memory address, wherein the page table entry indicates that the configuration space is available to the guest OS; means for identifying an additional device slot associated with the communication bus; and means for mapping, by the processing device executing the hypervisor, in the page table, an additional page table entry for an additional memory configuration space of the additional device slot to an additional memory address, wherein the additional page table entry indicates that the additional configuration space is available to the guest OS

What is claimed is:

1. A method comprising:
   receiving, by a processing device executing a hypervisor, a notification from a guest operating system (OS) of a virtual machine (VM), wherein the notification indicates a guest OS access of a memory address associated with a device slot of a communication bus, and wherein the device slot is unavailable to the guest OS;
   mapping, in a page table of the hypervisor, a page table entry for a memory configuration space of the device slot to the memory address, wherein the page table entry indicates that the memory configuration space is available to the guest OS;
   identifying an additional device slot associated with the communication bus; and
   mapping, by the processing device executing the hypervisor, in the page table, an additional page table entry for an additional memory configuration space of the additional device slot to an additional memory address, wherein the additional page table entry indicates that the additional memory configuration space is available to the guest OS.

2. The method of claim 1, further comprising:
   causing the additional memory configuration space of the additional device slot to be provided to the guest OS responsive to detecting a subsequent access of the additional memory address by the guest OS.

3. The method of claim 1, further comprising:
determining that the device slot of the communication bus is not associated with any device;
identifying one or more additional device slots that are not associated with any device;
generating one or more memory pages for the one or more additional device slots; and
mapping, in the page table, one or more additional page table entries for each of the corresponding one or more additional device slots, wherein the one or more additional page table entries indicate that the corresponding memory pages are read only for the guest OS.

4. The method of claim 1, further comprising:
identifying a disk image for the guest OS; and
loading, into hypervisor memory, at least a portion of the disk image for the guest OS.

5. The method of claim 1, further comprising:
identifying one or more additional resources associated with a boot device for the guest OS; and
mapping, in the page table, page table entries for the one or more additional resources associated with the boot device.

6. The method of claim 1, wherein the notification comprises a VM exit caused by the guest OS access of the memory address associated with the device.

7. The method of claim 1, further comprising:
detecting an out of memory condition associated with the guest OS; and
responsive to detecting the out of memory condition, unmapping the additional page table entry.

8. A system comprising:
a memory; and
a processing device, operatively coupled to the memory, to execute a hypervisor to:
detect a virtual machine (VM) exit issued by a guest operating system (OS) of the VM responsive to an access by the guest OS of a memory resource, wherein the memory resource is unavailable to the guest OS;
map, in a page table of the hypervisor, a page table entry for the memory resource, wherein the page table entry indicates that the memory resource is available to the guest OS;
determine a resource type for the memory resource;
identify an additional memory resource associated with the resource type; and
map, by the processing device executing the hypervisor, in the page table, an additional page table entry for the additional memory resource, wherein the additional page table entry indicates that the additional memory resource is available to the guest OS.

9. The system of claim 8, wherein the processing device is further to:
generate a memory page for the additional memory resource; and
cause the memory page of the additional memory resource to be provided to the guest OS responsive to detecting a subsequent access of the additional memory resource by the guest OS.

10. The system of claim 8, wherein the resource type comprises a device type, and wherein the processing device is further to:
identify one or more additional devices associated with the device type;
generate one or more memory pages for each of the one or more additional devices; and
map, in the page table, one or more additional page table entries for each of the corresponding one or more additional memory pages.

11. The system of claim 8, wherein the resource type indicates a device, and wherein the processing device is further to:
identify one or more additional devices;
generate one or more memory pages for each of the one or more additional devices; and
map, in the page table, one or more additional page table entries for each of the corresponding one or more additional memory pages.

12. The system of claim 8, wherein the processing device is further to:
determine that the resource type comprises a memory page associated with a boot operation of the guest OS;
identify an additional memory page associated with an additional boot operation of the guest OS;
load, into hypervisor memory, the additional memory page.

13. The system of claim 8, wherein the processing device is further to:
detecting an out of memory condition associated with the guest OS;
responsive to detecting the out of memory condition:
unmap the additional page table entry; and
deallocate a memory page associated with the additional page table entry.

14. A non-transitory computer readable medium comprising instructions, which when accessed by a processing device, cause the processing device to execute a hypervisor to:
receive a notification from a guest operating system (OS) of a virtual machine (VM), wherein the notification indicates a guest OS access of a memory address associated with a device slot of a communication bus, and wherein the device slot is unavailable to the guest OS;
map, in a page table of the hypervisor, a page table entry for a memory configuration space of the device slot to the memory address, wherein the page table entry indicates that the memory configuration space is available to the guest OS;
identify an additional device slot associated with the communication bus; and
map, in the page table, an additional page table entry for an additional memory configuration space of the additional device slot to an additional memory address, wherein the additional page table entry indicates that the additional memory configuration space is available to the guest OS.

15. The non-transitory computer readable storage medium of claim 14, wherein the processing device is further to:
cause the additional memory configuration space of the additional device slot to be provided to the guest OS responsive to detecting a subsequent access of the additional memory address by the guest OS.

16. The non-transitory computer readable storage medium of claim 14, wherein the processing device is further to:
determine that the device slot of the communication bus is not associated with any device;
identify one or more additional device slots that are not associated with any device;
generate one or more memory pages for the one or more additional device slots; and map, in the page table, one or more additional page table entries for each of the corresponding one or more additional device slots, wherein the one or more additional page table entries indicate that the corresponding memory pages are read only for the guest OS.

17. The non-transitory computer readable storage medium of claim 15, wherein the processing device is further to:
   identify a disk image for the guest OS; and
   load, into hypervisor memory, at least a portion of the disk image for the guest OS.

18. The non-transitory computer readable storage medium of claim 15, wherein the processing device is further to:
   identify one or more additional resources associated with a boot device for the guest OS; and
   map, in the page table, page table entries for the one or more additional resources associated with the boot device.

19. The non-transitory computer readable storage medium of claim 15, wherein the processing device is further to:
   detect an out of memory condition associated with the guest OS; and
   responsive to detecting the out of memory condition, unmap the additional page table entry.

20. The non-transitory computer readable storage medium of claim 15, wherein the notification comprises a VM exit caused by the guest OS access of the memory address associated with the device.

* * * * *